United States Patent
Tsukamoto et al.

(10) Patent No.: US 10,100,881 B2
(45) Date of Patent: Oct. 16, 2018

(54) CLUTCH SEAL

(71) Applicants: NOK CORPORATION, Tokyo (JP); NISSAN MOTOR CO., LTD., Yokohama-shi, Kanagawa (JP)

(72) Inventors: Koji Tsukamoto, Makinohara (JP); Kuniaki Miyake, Tokyo (JP); Toshihiro Mukaida, Makinohara (JP); Hitoshi Okabe, Fujisawa (JP); Atsushi Yokota, Fujisawa (JP); Tatsuya Osone, Yokohama (JP); Yuuzo Akasaka, Yokohama (JP); Hiroki Uehara, Yokohama (JP); Jun Furuichi, Yokohama (JP)

(73) Assignees: NOK Corporation (JP); Nissan Motor Co., Ltd. (JP)

( * ) Notice: Subject to any disclaimer, the term of this patent is extended or adjusted under 35 U.S.C. 154(b) by 526 days.

(21) Appl. No.: 14/440,170

(22) PCT Filed: Oct. 8, 2013

(86) PCT No.: PCT/JP2013/077280
§ 371 (c)(1),
(2) Date: May 1, 2015

(87) PCT Pub. No.: WO2014/073308
PCT Pub. Date: May 15, 2014

(65) Prior Publication Data
US 2015/0292572 A1   Oct. 15, 2015

(30) Foreign Application Priority Data
Nov. 6, 2012   (JP) .................. 2012-244295

(51) Int. Cl.
*F16J 3/00* (2006.01)
*F16D 25/12* (2006.01)
(Continued)

(52) U.S. Cl.
CPC .......... *F16D 25/12* (2013.01); *F16D 25/063* (2013.01); *F16D 25/083* (2013.01); *F16J 3/041* (2013.01); *F16J 15/52* (2013.01); *F16D 2300/08* (2013.01)

(58) Field of Classification Search
CPC ...... F16D 25/12; F16D 25/063; F16D 25/083; F16D 2300/08; F16J 3/041; F16J 15/52
(Continued)

(56) References Cited

U.S. PATENT DOCUMENTS 4,658,644 A * 4/1987 Coesfeld ............. B60C 23/0425
336/30
7,775,528 B2 * 8/2010 Berdichevsky ........ F16J 5/3244
277/559
(Continued)

FOREIGN PATENT DOCUMENTS

CN       1934366 A      3/2007
DE    19627617 A1      1/1998
(Continued)

OTHER PUBLICATIONS

Extended European Search Report for EP Application No. 13853720.4, dated Jul. 15, 2016 (7 pages).

*Primary Examiner* — Nathan Cumar
(74) *Attorney, Agent, or Firm* — Harness, Dickey & Pierce, P.L.C.

(57) ABSTRACT

The invention provides a clutch seal which can enhance a durability of a membrane portion which is a constituting part of a seal and is constructed by a rubber-like elastic body, and can inhibit a working fluid from standing in a concave surface of the membrane portion. The clutch seal of the invention is an annular seal interposed between a clutch plate in a dry clutch and a piston pressing the clutch plate, has a middle ring fixed to the piston between an outer ring and an inner ring which are fixed to a clutch housing, and has membrane portions constructed by a rubber-like elastic body respectively between the outer ring and the middle ring and between the inner ring and the middle ring, wherein the middle ring is arranged at an intermediate position of a stroke in an initial shape of the membrane portion.

19 Claims, 4 Drawing Sheets

(51) Int. Cl.
    *F16D 25/063*    (2006.01)
    *F16D 25/08*     (2006.01)
    *F16J 15/52*     (2006.01)
    *F16J 3/04*      (2006.01)

(58) Field of Classification Search
    USPC ........................................................ 277/634
    See application file for complete search history.

(56) References Cited

U.S. PATENT DOCUMENTS

| | | | | |
|---|---|---|---|---|
| 8,640,844 | B2* | 2/2014 | Kuwahara | F16D 25/082 |
| | | | | 192/113.5 |
| 2005/0046115 | A1* | 3/2005 | Yokoyama | F16J 15/3284 |
| | | | | 277/549 |
| 2009/0236189 | A1* | 9/2009 | Macke | F16D 65/183 |
| | | | | 188/73.43 |
| 2013/0168197 | A1* | 7/2013 | Furuichi | F16D 25/044 |
| | | | | 192/85.39 |

FOREIGN PATENT DOCUMENTS

| | | | |
|---|---|---|---|
| EP | 0677686 | A1 | 10/1995 |
| FR | 2718819 | A1 | 10/1995 |
| JP | S61-91534 | A | 5/1986 |
| JP | H08-121609 | A | 5/1996 |
| JP | 2009-085274 | A | 4/2009 |
| JP | 2010-151312 | A | 7/2010 |
| JP | 2010-151313 | A | 7/2010 |
| JP | 2011-220507 | A | 11/2011 |
| JP | 2012-052562 | A | 3/2012 |

* cited by examiner

CLUTCH SEAL

CROSS-REFERENCE TO RELATED APPLICATIONS

This application is a 371 U.S. National Stage Application of International Application No. PCT/JP2013/077280, filed on Oct. 8, 2013, and published in Japanese as WO 2014/073308 A1 on May 15, 2014. This application claims priority to Japanese Application No. 2012-244295, filed on Nov. 6, 2012. The entire disclosures of the above applications are incorporated herein by reference.

BACKGROUND OF THE INVENTION

1. Field of the Invention

The present invention relates to an annular clutch seal which is interposed between a clutch plate in a dry clutch and a piston pressing the clutch plate. The clutch seal of the present invention is employed, for example, in a hybrid driving force transmission device and an automatic transmission of a vehicle such as a motor vehicle.

2. Description of the Conventional Art

There has been conventionally known a clutch seal 54 which is an annular seal 54 interposed between a clutch plate 52 in a dry clutch 51 and a piston 53 pressing the clutch plate 52, has a middle ring 58 fixed to the piston between an outer ring 56 and an inner ring 57 which are fixed to a clutch housing 55, and has membrane portions 59 and 60 constructed by a rubber-like elastic body respectively between the outer ring 56 and the middle ring 58 and between the inner ring 57 and the middle ring 58, as shown in FIG. 5. The piston 53 moves rightward in the drawing by being pressed by a working fluid, turns on the clutch by pressing the clutch plate 52, and turns off the clutch by returning leftward. The seal 54 plays a role of sealing the working fluid so as to prevent the working fluid from entering into the clutch plate 52 side.

In the clutch seal 54, the membrane portions 59 and 60 constructed by the rubber-like elastic body elastically deform repeatedly according to a stroke action of the piston 53, and the membrane portions 59 and 60 are constantly exposed to a centrifugal force at the high-speed turning time. As a result, it is necessary to make an effect to enhance a durability of the membrane portions 59 and 60 as much as possible.

Further, in the case that the working fluid stands in concave surfaces of the membrane portions 59 and 60, the membrane portions 59 and 60 are abnormally deformed, generated strain becomes great, and the membrane portions 59 and 60 run into breakage. Therefore, it is important to prevent the working fluid from standing in the concave surfaces of the membrane portions 59 and 60.

SUMMARY OF THE INVENTION

Problem to be Solved by the Invention

The present invention is made by taking the above points into consideration, and an object of the present invention is to provide a clutch seal which can enhance a durability of a membrane portion which is a constituting part of a seal and is constructed by a rubber-like elastic body, and is additionally to provide a clutch seal which can inhibit a working fluid from standing in a concave surface of the membrane portion. Further, an additional object of the present invention is to provide a clutch seal which can maintain a sealing performance between a clutch housing and a seal as well as enhancing a fixing force of the seal in relation to the clutch housing.

Means for Solving the Problem

In order to achieve the object mentioned above, a clutch seal according to a first aspect of the present invention is a clutch seal which is an annular seal interposed between a clutch plate in a dry clutch and a piston pressing the clutch plate, has a middle ring fixed to the piston between an outer ring and an inner ring which are fixed to a clutch housing, and has membrane portions constructed by a rubber-like elastic body respectively between the outer ring and the middle ring and between the inner ring and the middle ring, wherein the middle ring is arranged at an intermediate position of a stroke in an initial shape of the membrane portion.

Further, a clutch seal according to a second aspect of the present invention is the clutch seal described in the first aspect mentioned above, wherein the intermediate position of the stroke is a position between 25 and 95% in a stroke from a piston side stroke end limit of the middle ring to a clutch plate side stroke end limit.

Further, a clutch seal according to a third aspect of the present invention is the clutch seal described in the first or second aspect mentioned above, wherein the outside membrane portion arranged between the outer ring and the middle ring integrally has an outside root portion, a first fold-back portion protruding to the piston side, a straight portion, a second fold-back portion protruding to the clutch plate side and an inside root portion, between an outside fixed portion fixed to the outer ring and an inside fixed portion fixed to the middle ring, in this order, and the straight portion is provided with an angle of inclination which is directed to be diameter reduced from the first fold-back portion to the second fold-back portion.

Further, a clutch seal according to a fourth aspect of the present invention is the clutch seal described in the third aspect mentioned above, wherein a magnitude of the angle of inclination is less than 15 degrees.

Further, a clutch seal according to a fifth aspect of the present invention is the clutch seal described in any one of the first to fourth aspects mentioned above, wherein the outside membrane portion arranged between the outer ring and the middle ring integrally has an outside root portion, a first fold-back portion protruding to the piston side, a straight portion, a second fold-back portion protruding to the clutch plate side and an inside root portion, between an outside fixed portion fixed to the outer ring and an inside fixed portion fixed to the middle ring, in this order, the outside membrane portion is provided with a gradually changing shape in which an axial thickness from a top portion of the first fold-back portion to the outside root portion becomes thicker little by little, the inside membrane portion arranged between the inner ring and the middle ring integrally has an inside root portion, a first fold-back portion protruding to the piston side, a straight portion, a second fold-back portion protruding to the clutch plate side and an outside root portion, between an inside fixed portion fixed to the inner ring and an outside fixed portion fixed to the middle portion, in this order, and the inside membrane portion is provided with a gradually changing shape in which an axial thickness from a top portion of the first fold-back portion to the inside root portion becomes thicker little by little.

Further, a clutch seal according to a sixth aspect of the present invention is the clutch seal described in any one of the first to fifth aspects mentioned above, wherein the outer ring and/or the inner ring has a metal fitting portion which is a press molded metal ring and is metal fitted to the clutch housing, and the membrane portion has a rubber seal portion which comes into close contact with the clutch housing.

Further, a clutch seal according to a seventh aspect of the present invention is the clutch seal described in the sixth aspect mentioned above, wherein the rubber seal portion is formed into a lip shape which is provided with a seal directionality and is inclined to one side in an axial direction.

In the case that the piston acts in stroke so as to connect and disconnect the clutch in the dry clutch of the hybrid driving force transmission device in the vehicle, for example, the motor vehicle, the middle ring of the seal is driven by the stroke action. As a result, the membrane portion constructed by the rubber-like elastic body elastically deforms, and the membrane portion elastically deforms between one end limit of the stroke of the middle ring and the other end limit at this time. Therefore, in the case that the middle ring is arranged in the stroke one end limit in the initial shape of the membrane portion, the membrane portion elastically deforms over the full stroke until the middle ring reaches the stroke other end limit. As a result, an amount of elastic deformation (an amount of strain) is enlarged, and a great internal stress is generated in correspondence to the deformation. The membrane portion fatigues in early stages due to repeat of the internal stress. On the contrary, in the present invention, since the middle ring is arranged at the intermediate position of the stroke in the initial shape of the membrane portion, the amount of elastic deformation of the membrane portion is small in both of the case that the middle ring heads for the stroke one end limit from the intermediate position and the case that the middle ring heads for the other end limit, and the generated internal stress is small. Therefore, since a degree of fatigue of the membrane portion can be reduced, a durability of the membrane portion can be enhanced. The initial shape of the membrane portion is a shape when the membrane portion is molded by a metal mold, and is a shape which is not deformed by an eternal load.

The intermediate position of the stroke where the middle ring is arranged in the initial shape of the membrane portion is the center position of the stroke (for example, a position between 25 and 75% of the stroke from the piston side stroke end limit of the middle ring to the clutch plate side stroke end limit) in principle, however, since the clutch plate is going to wear by a long time use of the clutch, the stroke tends to be extended. Therefore, taking into consideration the matter that the stroke of the middle ring is extended as mentioned above, the initial position is preferably longer toward the clutch plate side stroke end limit, that is, a position between 25 and 95% of the stroke from the piston side stroke end limit of the middle ring to the clutch plate side stroke end limit. According to this structure, since the middle ring is arranged at the intermediate position (approximately the center position) of the stroke even if the clutch plate wears, the amount of elastic deformation of the membrane portion is still small.

Further, in order to further enhance the durability of the membrane portion, the following structures are preferable.

(1) As to the outside membrane portion arranged between the outer ring and the middle ring (1-1) The outside membrane portion is structured such as to integrally have an outside root portion, a first fold-back portion protruding to the piston side, a straight portion, a second fold-back portion protruding to the clutch plate side and an inside root portion, between an outside fixed portion fixed to the outer ring and an inside fixed portion fixed to the middle ring, in this order.

(1-2) In order to prevent the strain from being concentrated on the outside root portion and prevent the first fold-back portion from coming into contact with the outside fixed portion in the case that the outside membrane portion is pulled back toward the stroke one end limit (the piston side stroke end limit), the following structures are employed.

(1-2-1) The axial thickness from the top portion of the first fold-back portion (the top portion of the circular arc-shaped cross section) to the outside root portion is set to a gradually changing shape which is thicker little by little from an inner side toward an outer side in a diametrical direction.

(1-2-2) The maximum axial thickness of the outside root portion is made larger than the thickness of the straight portion (for example, between 1.5 and triple).

(1-2-3) A predetermined opening angle (a rising angle, for example, between 40 and 70 degrees) in relation to an axial direction is set in the outside root portion.

(1-3) Further, in order to prevent the strain from being concentrated on the inside root portion and prevent the straight portion from swelling on the basis of the centrifugal force in the case that the outside membrane portion is pushed out toward the stroke other end limit (the clutch plate side stroke end limit), the following structures are employed.

(1-3-1) Each of the fold-back widths of the first and second fold-back portions is set to be equal to or less than a half of a membrane full width (for example, between one fifth and one third).

(1-3-2) An angle of inclination (for example, an angle of inclination equal to or less than 10 degrees) is attached to the straight portion, the angle of inclination being directed to be diameter reduced from the first fold-back portion to the second fold-back portion.

(2) As to the inside membrane portion arranged between the inner ring and the middle ring (2-1) The inside membrane portion is structured such as to integrally have an inside root portion, a first fold-back portion protruding to the piston side, a straight portion, a second fold-back portion protruding to the clutch plate side and an outside root portion, between an inside fixed portion fixed to the inner ring and an outside fixed portion fixed to the middle ring, in this order.

(2-2) In order to prevent the first fold-back portion from coming into contact with the other parts in the case that the inside membrane portion is pulled back toward the stroke one end limit (the piston side stroke end limit), the following structures are employed.

(2-2-1) The axial thickness from the top portion of the first fold-back portion (the top portion of the circular arc-shaped cross section) to the inside root portion is set to a gradually changing shape which is thicker little by little from an outer side toward an inner side in a diametrical direction.

(2-2-2) The maximum axial thickness of the inside root portion is made larger than the thickness of the straight portion (for example, between twice and fourth).

(2-2-3) A predetermined opening angle (a rising angle, for example, between 25 and 45 degrees) in relation to an axial direction is set in the inside root portion.

(2-3) Further, in order to prevent the strain from being concentrated on the second fold-back portion and prevent the straight portion from swelling on the basis of the centrifugal force in the case that the inside membrane portion is pushed out toward the stroke other end limit (the clutch plate side stroke end limit), the following structures are employed.

(2-3-1) Each of the fold-back widths of the first and second fold-back portions is set to be equal to or less than a half of a membrane full width (for example, between one fifth and one third).

(2-3-2) An angle of inclination (for example, an angle of inclination equal to or less than 10 degrees) is attached to the straight portion, the angle of inclination being directed to be diameter increased from the first fold-back portion to the second fold-back portion.

Each of the structures (1-1) to (2-3-2) mentioned above is derived by the inventors of the present invention as a result of devoting themselves to make a study, and it is possible to further enhance the durability of the membrane portion on the basis of these structures.

Further, it is effective for inhibiting the working fluid from standing in the concave surface of the membrane portion to attach the angle of inclination directed to be diameter reduced from the first fold-back portion to the second fold-back portion to the straight portion according to the item (1-3-2) in these structures.

In other words, in the case that the outside membrane portion is structured such as to integrally have the outside root portion, the first fold-back portion protruding to the piston side, the straight portion, the second fold-back portion protruding to the clutch plate side and the inside root portion, between the outside fixed portion fixed to the outer ring and the inside fixed portion fixed to the middle ring, in this order as mentioned above, the concave surface of the membrane portion is formed in the inner peripheral side of the straight portion and in the back surface side (the piston side) of the second fold-back portion. As a result, the working fluid tends to stand here, however, in the case that the angle of inclination directed to be diameter reduced from the first fold-back portion to the second fold-back portion is attached to the straight portion and the straight portion is formed into the inclined surface shape (the taper surface shape), the working fluid flows out of the concave surface to the external portion along the inclined surface. Therefore, it is possible to inhibit the working fluid from standing in the concave surface of the membrane portion. The magnitude of the angle of inclination in this case is preferably less than 15 degrees.

Further, in the conventional seal, since the seal is installed to the clutch housing in the state in which only the rubber-like elastic body is in contact with the clutch housing, the fixing force of the seal to the clutch housing is comparatively small. However, in the present invention, since the outer ring and/or the inner ring is metal fitted to the clutch housing while having the metal fitting portion as well as being formed as the press molded metal ring, it is possible to enhance the fixing force of the seal to the clutch housing. Further, according to the metal fitting mentioned above, the fixing force is enhanced, however, there is a risk that the sealing performance is lowered. However, in the present invention, since the membrane portion has the rubber seal portion which comes into close contact with the clutch housing, it is possible to suppress the reduction of the sealing performance on the basis of the sealing action achieved by the rubber seal portion. Therefore, it is possible to realize the clutch seal which has a high fixing force and can maintain the sealing performance.

The rubber seal portion is preferably set to a lip-like rubber seal portion which is inclined to one side in an axial direction while having a seal directionality, and it is possible to effectively inhibit the piston working fluid from leaking to the clutch plate side according to the rubber seal portion having the directionality as mentioned above.

Effect of the Invention

The present invention achieves the following effects.

In other words, the present invention is structured as described above such that the middle ring is arranged at the intermediate position of the stroke in the initial shape of the membrane portion, the intermediate position of the stroke is set to the position between 25 and 95% in the stroke from the piston side stroke end limit of the middle ring to the clutch plate side stroke end limit, and the outside and inside membrane portions are provided with the gradually changing shapes in which the axial thickness from the top portions of the fold-back portions to the root portions become thicker little by little. As a result, it is possible to enhance the durability of the membrane portion constructed by the rubber-like elastic body. Further, the straight portion of the outside membrane portion is provided with the angle of inclination which is directed to be diameter reduced from the first fold-back portion to the second fold-back portion. As a result, it is possible to inhibit the working fluid from standing in the concave surface of the membrane portion. Further, the outer ring and/or the inner ring is formed as the press molded metal ring so as to be metal fitted to the clutch housing, and the rubber seal portion is provided with the membrane portion in parallel. As a result, it is possible to maintain the sealing performance between the clutch housing and the seal as well as enhancing the fixing force of the seal to the clutch housing. Further, it is possible to effectively inhibit the piston working fluid from leaking to the clutch plate side by using the lip-like rubber seal portion which is inclined to one side in the axial direction while having the seal directionality.

DETAILED DESCRIPTION OF PREFERRED EMBODIMENT

Next, a description will be given of an embodiment according to the present invention with reference to the accompanying drawings.

Figure 1:
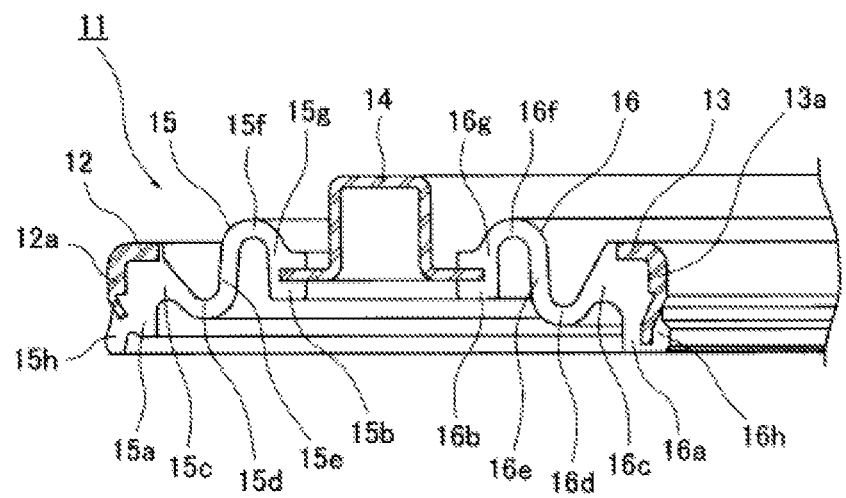
FIG. 1 is a cross sectional view of a substantial part of a clutch seal according to an embodiment of the present invention.
Figure 5:
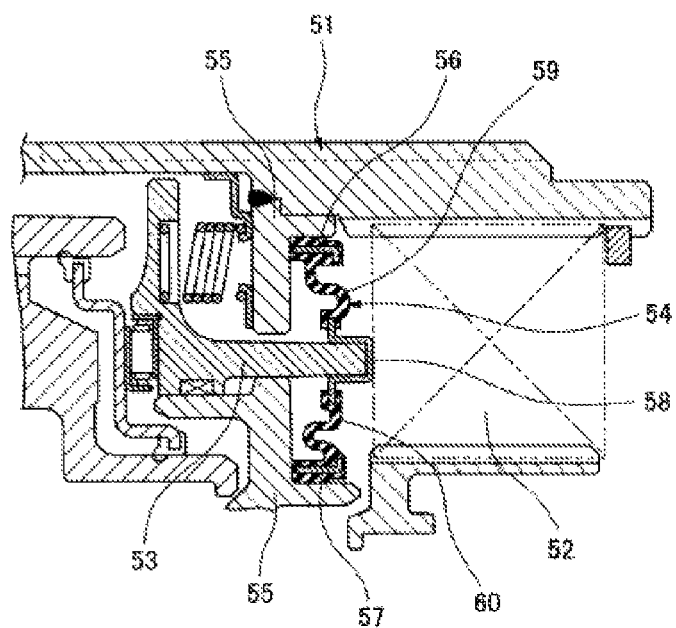
FIG. 5 is a cross sectional view of a substantial part and shows an installed state of a clutch seal according to a prior art.

FIG. 1 shows a clutch seal 11 according to an embodiment of the present invention. The clutch seal (a bellows seal) 11 according to the embodiment is an annular seal which is interposed between a clutch plate 52 (refer to FIG. 5) in a dry clutch 51 (refer to FIG. 5) and a piston 53 pressing the clutch plate 52, in a hybrid driving force transmission device of a vehicle, for example, a motor vehicle, has an outer ring 12 and an inner ring 13 which are fixed to a clutch housing 55 (refer to FIG. 5), a middle ring 14 which is arranged between the outer ring 12 and the inner ring 13 and is fixed to the piston 53, an annular outside membrane portion 15 which is arranged between the outer ring 12 and the middle ring 14 and is constructed by a rubber-like elastic body, and an annular inside membrane portion 16 which is arranged between the inner ring 13 and the middle ring 14 and is constructed by a rubber-like elastic body, and further has the following structure.

More specifically, in order to reduce an amount of strain of the membrane portions 15 and 16 at a stroke end limit position of the middle ring 14, the middle ring 14 is arranged at an intermediate position of the stroke in the initial shapes of the membrane portions 15 and 16. In other words, the initial shapes of the membrane portions 15 and 16 are set in a state in which the middle ring 14 is positioned in an intermediate of the stroke. The initial shapes of the membrane portions 15 and 16 are the shapes when the membrane portions 15 and 16 are molded by the metal mold, and are the shapes when the amount of strain is zero or the minimum value.

The intermediate position of the stroke where the middle ring 14 is arranged in the initial shapes of the membrane portions 15 and 16 is the center position of the stroke, for example, a position between 25 and 75% of the stroke from the piston side stroke end limit of the middle ring 14 to the clutch plate side stroke end limit in principle, however, since the clutch plate 52 is going to wear by a long time use of the clutch 51, the stroke tends to be extended. Therefore, taking into consideration the matter that the stroke of the middle ring 14 is extended as mentioned above, the initial position is preferably longer toward the clutch plate side stroke end limit, that is, a position between 25 and 95% of the stroke from the piston side stroke end limit of the middle ring 14 to the clutch plate side stroke end limit, and is further preferably a position which goes beyond 50% and between 55 and 90%. According to these structures, since the middle ring 14 is arranged at the intermediate position of the stroke even if the clutch plate 52 wears, the amount of elastic deformation of the membrane portions 15 and 16 can be still held down.

Further, the membrane portions 15 and 16 are structured as follows, for further enhancing the durability thereof.

(1) As to the outside membrane portion 15 arranged between the outer ring 12 and the middle ring 14

Figure 2:
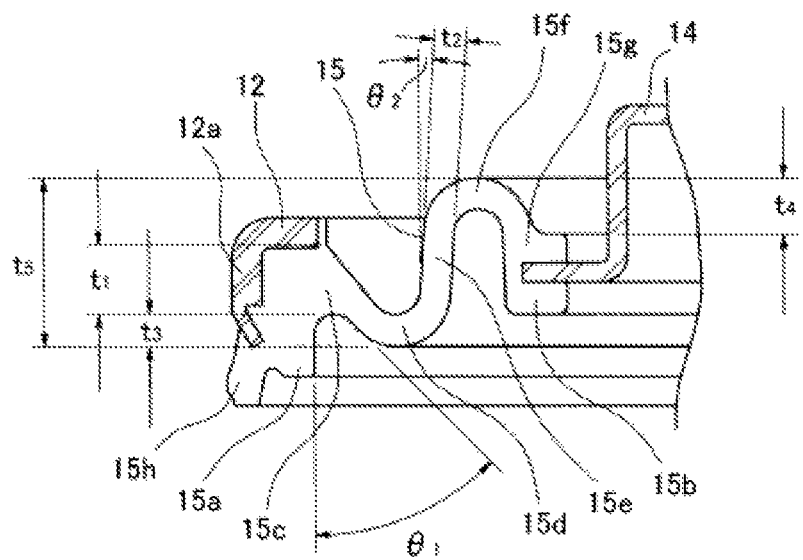
FIG. 2 is a partly enlarged view of FIG. 1.

(1-1) As shown in FIG. 2 in an enlarged manner, the outside membrane portion 15 is structured such as to integrally have an outside root portion (an outer peripheral side outside root portion) 15c, a first fold-back portion (an outer peripheral side first fold-back portion) 15d protruding toward a stroke one end limit side (a piston side, a downward side in the drawing) of the middle ring 14 and having a circular arc shape in its cross section, a straight portion (an outer peripheral side straight portion) 15e, a second fold-back portion (an outer peripheral side second fold-back portion) 15f protruding to a stroke other end limit side (a clutch plate side, an upward side in the drawing) and having a circular arc shape in its cross section, and an inside root portion (an outer peripheral side inside root portion) 15g, between an outside fixed portion (an outer peripheral side outside fixed portion) 15a fixed (vulcanization bonded) to the outer ring 12 and an inside fixed portion (an outer peripheral side fixed portion) 15b fixed (vulcanization bonded) to the middle ring 14, in this order.

(1-2) In order to prevent the strain from being concentrated on the outside root portion 15c and prevent the first fold-back portion 15d from coming into contact with the outside fixed portion 15a in the case that the outside membrane portion 15 is pulled back toward the stroke one end limit, the following structures are provided.

(1-2-1) The axial thickness from a top portion (a top portion formed into a circular arc cross sectional shape) of the first fold-back portion 15d to the outside root portion 15c is set to a gradually changing shape which is thicker little by little from an inner side toward an outer side in a diametrical direction.

(1-2-2) The maximum axial thickness $t_1$ of the outside root portion 15c is set to 1.5 times to triple of the thickness $t_2$ of the straight portion 15e.

(1-2-3) An opening angle (a rising angle) $\theta_1$ of the outside root portion 15c is set to 40 to 70 degrees.

(1-3) Further, in order to prevent the strain from being concentrated on the inside root portion 15g and prevent the straight portion 15e from swelling on the basis of the centrifugal force in the case that the outside membrane portion 15 is pushed out toward the stroke other end limit, the following structures are provided.

(1-3-1) Each of fold-back widths (axial protruding lengths from the root portion) $t_3$ and $t_4$ of the first and second fold-back portions 15d and 15f is set to one fifth to one third of a half of a membrane full width (an axial length of a flexible portion constructed by the outside root portion 15c, the first fold-back portion 15d, the straight portion 15e, the second fold-back portion 15f and the inside root portion 15g) $t_5$.

(1-3-2) An angle of inclination $\theta 2$ equal to or less than 10 degrees is attached to the straight portion 15e, the angle of inclination being directed to be diameter reduced from the first fold-back portion 15d to the second fold-back portion 15f.

(2) As to the inside membrane portion 16 arranged between the inner ring 13 and the middle ring 14

Figure 3:
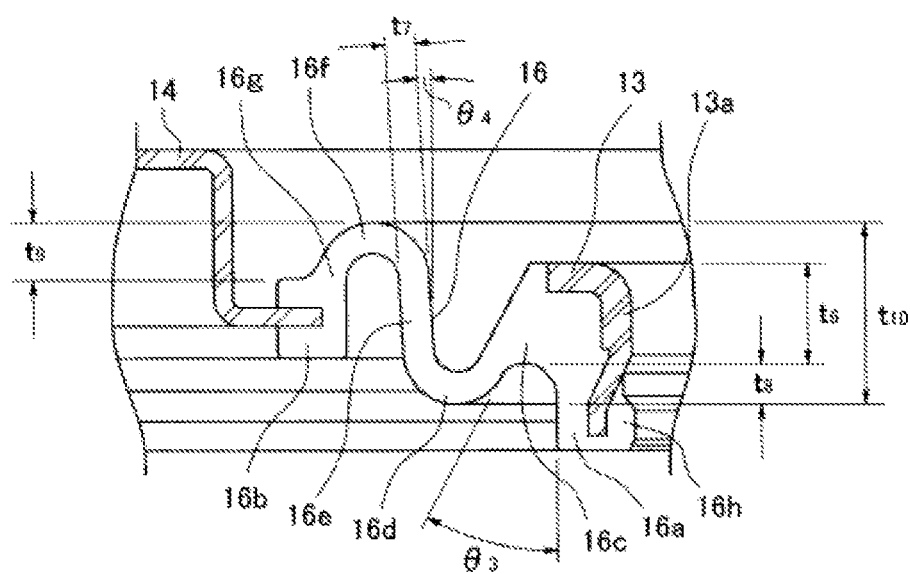
FIG. 3 is a partly enlarged view of FIG. 1 in the same manner.

(2-1) As shown in FIG. 3 in an enlarged manner, the inside membrane portion 16 is structured such as to integrally have an inside root portion (an inner peripheral side inside root portion) 16c, a first fold-back portion (an inner peripheral side first fold-back portion) 16e protruding to the stroke one end limit side of the middle ring 14 and having a circular arc shape in its cross section, a straight portion (an inner peripheral side straight portion) 16e, a second fold-back portion (an inner peripheral side second fold-back portion) 16f protruding to the stroke other end limit side of the middle ring 14 and having a circular arc shape in its cross section, and an outside root portion (an inner peripheral side outside root portion) 16g, between an inside fixed portion (an inner peripheral side inside fixed portion) 16a fixed (vulcanization bonded) to the inner ring 13 and an outside fixed portion (an inner peripheral side outside fixed portion) 16b fixed (vulcanization bonded) to the middle ring 14, in this order.

(2-2) In order to prevent the first fold-back portion 16d from coming into contact with the other parts in the case that the inside membrane portion 16 is pulled back toward the stroke one end limit, the following structures are provided.

(2-2-1) The axial thickness from the top portion (the top portion formed into a circular arc cross sectional shape) of the first fold-back portion 16d to the inside root portion 16c is set to a gradually changing shape which is thicker little by little from an outer side toward an inner side in a diametrical direction.

(2-2-2) The maximum axial thickness $t_6$ of the inside root portion 16c is set to twice to fourth of the thickness $t_7$ of the straight portion 16e.

(2-2-3) An opening angle (a rising angle) $\theta_3$ of the inside root portion 16c is set to 25 to 45 degrees.

(2-3) In order to prevent the strain from being concentrated on the second fold-back portion 16f and prevent the straight portion 16e from swelling on the basis of the centrifugal force in the case that the inside membrane portion 16 is pushed out toward the stroke other end limit, the following structures are provided.

(2-3-1) Each of fold-back widths of the first and second fold-back portions 16d and 16f (axial protruding lengths from the root portion) $t_8$ and $t_9$ is set to one fifth to one third of a half of a membrane full width (an axial length of a flexible portion constructed by the inside root portion 16c, the first fold-back portion 16d, the straight portion 16e, the second fold-back portion 16f and the outside root portion 16g) $t_{10}$.

(2-3-2) An angle of inclination $\theta_4$ equal to or less than 10 degrees is attached to the straight portion 16e, the angle of inclination being directed to be diameter increased from the first fold-back portion 16d to the second fold-back portion 16f.

Each of the membrane portions 15 and 16 is molded by a material which is selected from the following (i) to (vi).

(i) acrylic rubber which is improved in a fatigue property and a low-temperature property (ii) chloroprene rubber which is improved in a high-temperature property and an oil resistance (iii) silicone rubber which is improved in an oil resistance, a rubber strength and a fatigue property (iv) nitrile rubber which is improved in a high-temperature property and a fatigue property (v) hydrogenated nitrile rubber which is improved in a fatigue property and a low-temperature property (vi) fluorine-container rubber which is improved in a fatigue property and a low-temperature property Each of the outer ring 12, the inner ring 13 and the middle ring 14 is formed by a press molded metal ring.

The outer ring 12 and the inner ring 13 are respectively provided with metal fitting portions 12a and 13a which are metal fitted to the clutch housing 55.

Rubber seal portions 15h and 16h coming into close contact with the clutch housing 55 are attached (vulcanization bonded) respectively to the outer ring 12 and the inner ring 13, and these rubber seal portions 15h and 16h are provided as parts of the membrane portions 15 and 16.

Further, the rubber seal portion 15h attached to the outer ring 12 is formed as a lip-like rubber seal portion which is provided with a seal directionality and is inclined to one side in an axial direction.

In the clutch seal 11 having the structure mentioned above, since the middle ring 14 is arranged at the intermediate position of the stroke in the initial shapes of the membrane portions 15 and 16, and the structures (1-1) to (2-3-2) are employed as mentioned above, it is possible to enhance the durability of the membrane portions 15 and 16 which are constructed by the rubber-like elastic body. Further, since the outer ring 12 and the inner ring 13 are metal fitted as the press molded metal rings to the clutch housing 55, and the rubber seal portions 15h and 16h are provided in line in the membrane portions 15 and 16, it is possible to enhance the fixing force of the seal 11 to the clutch housing 55 and it is possible to maintain the sealing performance between the clutch housing 55 and the seal 11. Further, it is possible to effectively inhibit the piston working fluid from leaking to the clutch plate side by employing the lip-like rubber seal portion 15h which is provided with the seal directionality and is inclined to the one side in the axial direction.

Further, in these structures, since the angle of inclination $\theta_2$ is applied to the straight portion 15e of the outside membrane portion 15, the angle of inclination being directed to be diameter reduced from the first fold-back portion 15d to the second fold-back portion 15f according to the item (1-3-2) mentioned above, it is possible to inhibit the working fluid from standing in the concave surface of the membrane portion 15.

Figure 4A:
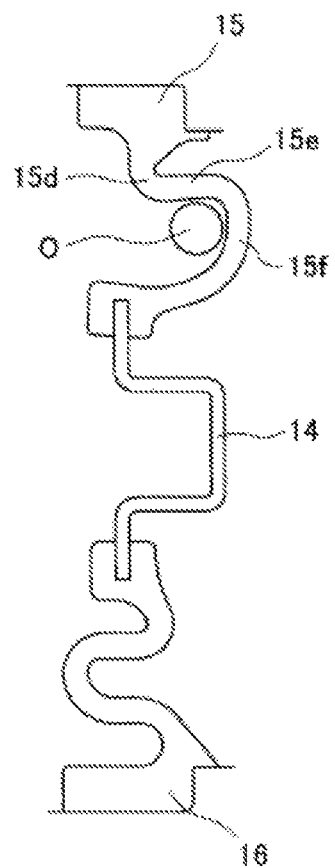
FIG. 4A is a cross sectional view of a substantial part and shows an acting state of a clutch seal according to a comparative example.
Figure 4B:
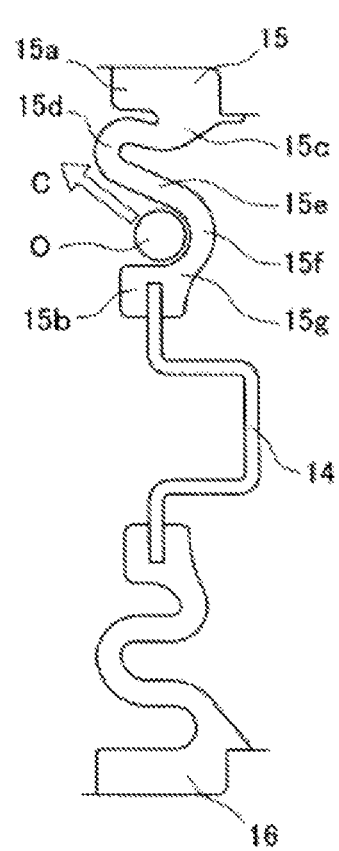
FIG. 4B is a cross sectional view of a substantial part and shows an acting state of the clutch seal according to the embodiment of the present invention.

In other words, in the case that the outside membrane portion 15 integrally has the outside root portion 15c, the first fold-back portion 15d protruding toward the stroke one end limit side of the middle ring 14 and having the circular arc shape in its cross section, the straight portion 15e, the second fold-back portion 15f protruding to the stroke other end limit side and having the circular arc shape in its cross section, and the inside root portion 15g, between the outside fixed portion 15a fixed to the outer ring 12 and the inside fixed portion 15b fixed to the middle ring 14, in this order as mentioned above, the concave surface of the membrane portion 15 is formed in the back surface side (the piston side) of the second fold-back portion 15f in the inner peripheral side of the straight portion 15e. As a result, the working fluid O tends to stand in the concave surface as shown by a comparative view in FIG. 4A. However, as shown in FIG. 4B, in the seal 11 according to the embodiment, the angle of inclination θ2 is applied to the straight portion 15e, the angle of inclination being directed to be diameter reduced from the first fold-back portion 15d to the second fold-back portion 15f. Therefore, the working fluid O flows out of the concave surface to the outer portion along the straight portion 15e to which the angle of inclination θ2 is applied (an arrow C). Accordingly, it is possible to inhibit the working fluid O from standing in the concave surface of the membrane portion 15. As a result, it is possible to inhibit the membrane portion 15 from being abnormally deformed, inhibit the generation strain from being enlarged, and inhibit the membrane portion 15 from being broken. A magnitude of the angle of inclination $\theta_2$ in this case is preferably less than 15 degrees, and further preferably in a range between 5 and 10 degrees. Further, the angle of inclination $\theta_2$ is preferably maintained over the full stroke of the middle ring 14.

Inhibition of the working fluid from standing in the concave surface of the membrane portion by the application of the angle of inclination to the straight portion can be applied to the inside membrane portion 16 as occasion demands. The inside membrane portion 16 may be used in a way of possibility of oil standing, and the angle of inclination directed to discharge the oil may be applied to the straight portion 16e in this case.

What is claimed is:

1. A clutch seal for a dry clutch including a clutch plate and a piston that presses the clutch plate, the clutch seal being an annular seal interposed between the clutch plate and the piston, and comprising:
   a middle ring configured to be fixed to the piston, the middle ring being located between an outer ring located radially outward from the middle ring and an inner ring located radially inward from the middle ring that are each configured to be fixed to a clutch housing; and
   a pair of membrane portions that are each constructed by an elastic body and located, respectively, between the outer ring and the middle ring and between the inner ring and the middle ring, each of the membrane portions including an outside root portion connected, respectively, to the outer ring and the inner ring, a first fold-back portion including a portion connected to the outside root portion that extends in a direction radially inward toward the middle ring and axially back toward the piston, a straight portion connected to the first fold-back portion that extends axially toward the clutch plate, and a second fold-back portion including a portion that extends axially back toward the piston and is connected to an inside root portion that is connected to the middle ring;

wherein the middle ring is arranged at an intermediate position of a stroke in an initial shape of the membrane portions.

2. The clutch seal according to claim 1, wherein the intermediate position of the stroke is a position between 25 and 95% in a stroke from a piston side stroke end limit of the middle ring to a clutch plate side stroke end limit.

3. The clutch seal according to claim 1, wherein the straight portion is provided with an angle of inclination which is directed to be diameter reduced from the first fold-back portion to the second fold-back portion.

4. The clutch seal according to claim 3, wherein a magnitude of the angle of inclination is less than 15 degrees.

5. The clutch seal according to claim 1, wherein an axial thickness of a portion of the first fold-back portion having a circular arc-shaped cross-section to the outside root portion becomes thicker little by little.

6. The clutch seal according to claim 1, wherein the outer ring and the inner ring each have a metal fitting portion which are press molded metal rings and are each metal fitted to the clutch housing, and wherein each of the membrane portions has a rubber seal portion which comes into close contact with the clutch housing.

7. The clutch seal according to claim 6, wherein the rubber seal portion is formed into a lip shape which is provided with a seal directionality and is inclined to one side in an axial direction.

8. The clutch seal according to claim 2, wherein the straight portion is provided with an angle of inclination which is directed to be diameter reduced from the first fold-back portion to the second fold-back portion.

9. The clutch seal according to claim 8, wherein a magnitude of the angle of inclination is less than 15 degrees.

10. The clutch seal according to claim 2, wherein an axial thickness of a portion of the first fold-back portion having a circular arc-shaped cross-section to the outside root portion becomes thicker little by little.

11. The clutch seal according to claim 3, wherein an axial thickness of a portion of the first fold-back portion having a circular arc-shaped cross-section to the outside root portion becomes thicker little by little.

12. The clutch seal according to claim 4, wherein an axial thickness of a portion of the first fold-back portion having a circular arc-shaped cross-section to the outside root portion becomes thicker little by little.

13. The clutch seal according to claim 8, wherein an axial thickness of a portion of the first fold-back portion having a circular arc-shaped cross-section to the outside root portion becomes thicker little by little.

14. The clutch seal according to claim 9, wherein an axial thickness of a portion of the first fold-back portion having a circular arc-shaped cross-section to the outside root portion becomes thicker little by little.

15. The clutch seal according to claim 2, wherein the outer ring and the inner ring each have a metal fitting portion which are press molded metal rings and are each metal fitted to the clutch housing, and wherein each of the membrane portions has a rubber seal portion which comes into close contact with the clutch housing.

16. The clutch seal according to claim 3, wherein the outer ring and the inner ring each have a metal fitting portion which are press molded metal rings and are each metal fitted to the clutch housing, and wherein each of the membrane portions has a rubber seal portion which comes into close contact with the clutch housing.

17. The clutch seal according to claim 4, wherein the outer ring and the inner ring each have a metal fitting portion which are press molded metal rings and are each metal fitted to the clutch housing, and wherein each of the membrane portions has a rubber seal portion which comes into close contact with the clutch housing.

18. The clutch seal according to claim 5, wherein the outer ring and the inner ring each have a metal fitting portion which are press molded metal rings and are each metal fitted to the clutch housing, and wherein each of the membrane portions has a rubber seal portion which comes into close contact with the clutch housing.

19. A clutch seal for a dry clutch including a clutch plate and a piston that presses the clutch plate, the clutch seal being an annular seal interposed between the clutch plate and the piston, and comprising:

a middle ring configured to be fixed to the piston, the middle ring being located between an outer ring and an inner ring that are each configured to be fixed to the clutch housing; and a pair of membrane portions that are each constructed by an elastic body and located, respectively, between the outer ring and the middle ring and between the inner ring and the middle ring, each of the membrane portions including an outside root portion connected, respectively, to the outer ring and the inner ring, a first fold-back portion including a portion connected to the outside root portion that extends back toward the piston, a straight portion connected to the first fold-back portion that extends toward the clutch plate, and a second fold-back portion including a portion that extends back toward the piston and is connected to an inside root portion that is connected to the middle ring;

wherein the middle ring is arranged at an intermediate position of a stroke in an initial shape of the membrane portions, and wherein, in the membrane portion connected to the outer ring, an axial thickness of a portion of the first fold-back portion having a circular arc-shaped cross-section to the outside root portion gradually thickens as the first fold-back portion having the circular arc-shaped cross-section transitions into the outside root portion.

* * * * *